(12) United States Patent
Allen

(10) Patent No.: US 11,130,393 B2
(45) Date of Patent: Sep. 28, 2021

(54) VEHICLE CARGO COVER SYSTEM AND RELATED COMPONENTRY

(71) Applicant: Motor City Aftermarket, Livonia, MI (US)

(72) Inventor: Adam Allen, Plymouth, MI (US)

(73) Assignee: Motor City Aftermarket, Livonia, MI (US)

( * ) Notice: Subject to any disclaimer, the term of this patent is extended or adjusted under 35 U.S.C. 154(b) by 0 days.

(21) Appl. No.: 16/904,804

(22) Filed: Jun. 18, 2020

(65) Prior Publication Data

US 2020/0398651 A1  Dec. 24, 2020

Related U.S. Application Data

(60) Provisional application No. 62/864,604, filed on Jun. 21, 2019.

(51) Int. Cl.
*B60J 7/16*  (2006.01)
*B60J 7/10*  (2006.01)
*B60P 7/02*  (2006.01)
*B60J 7/19*  (2006.01)

(52) U.S. Cl.
CPC ............. *B60J 7/1607* (2013.01); *B60J 7/102* (2013.01); *B60J 7/198* (2013.01); *B60P 7/02* (2013.01)

(58) Field of Classification Search
CPC ... B60J 7/041; B60J 7/068; B60J 7/085; B60J 7/0573; B60J 7/102; B60J 7/10; B60J 7/104; B60J 7/1607; B60J 7/198; B62D 35/00; B62D 37/02
See application file for complete search history.

(56) References Cited

U.S. PATENT DOCUMENTS

| | | | |
|---|---|---|---|
| 8,960,764 B2* | 2/2015 | Spencer | B60J 7/104 296/100.07 |
| 9,290,122 B2* | 3/2016 | Spencer | B60P 7/04 |
| 2017/0197498 A1* | 7/2017 | Facchinello | B60J 7/106 |
| 2019/0291553 A1* | 9/2019 | Ma | B60J 7/141 |
| 2020/0094660 A1* | 3/2020 | Ma | B60J 7/185 |
| 2020/0148046 A1* | 5/2020 | Ma | B60J 7/1607 |
| 2020/0189368 A1* | 6/2020 | Potter | B60J 7/102 |

* cited by examiner

*Primary Examiner* — Jason S Morrow
(74) *Attorney, Agent, or Firm* — Reising Ethington P.C.

(57) ABSTRACT

A vehicle cargo cover system, including a cover frame slider configured to be slidable along a slider axis and a ratchet strap assembly coupled to the cover frame slider. The ratchet strap assembly includes: a ratchet strap pivotably coupled to the cover frame slider about a strap axis generally parallel to the slider axis and a ratchet latch configured to accept the ratchet strap therethrough. The ratchet latch includes: a base, an advancement lever pivotable with respect to the base to advance the ratchet strap, and a releasable pawl movably coupled to the base to releasably latch the ratchet strap with respect to the base, and a hook carried by the base of the ratchet latch.

20 Claims, 12 Drawing Sheets

VEHICLE CARGO COVER SYSTEM AND RELATED COMPONENTRY

CROSS-REFERENCE TO RELATED APPLICATIONS

This application claims priority in U.S. Provisional Patent Application Ser. No. 62/864,604 filed Jun. 21, 2019, which is incorporated herein in its entirety, by reference.

TECHNICAL FIELD

This disclosure relates generally to vehicle cargo covers and, more particularly, to truck bed cover systems including covers and latches for removably securing covers to truck beds.

BACKGROUND

A typical pickup truck basically has a chassis, an engine compartment carried by the chassis at a front of the truck, a passenger cab carried on the chassis behind the engine compartment, and a cargo box carried on the chassis behind the cab. The cargo box is also referred to as a truck bed and includes a base bolted to the chassis, a front wall extending upwardly from the base behind the cab, sidewalls extending upwardly from the base and rearwardly from the front wall to rear ends, and a tailgate pivotably connected to the rear ends of the sidewalls. A typical truck bed cover basically includes a frame for mounting on the front and sidewalls of the truck bed, a rigid or flexible covering carried by the frame, and clamping devices to removably clamp portions of the frame to the sidewalls. The clamping devices typically include a multitude of rigid links pivotably coupled to a cover frame about cover longitudinal axes, rigid slidable handles that are foldable against the cover frame, threaded rods, springs, fasteners, and the like that tend to be large and custom-designed. Accordingly, conventional truck bed cover clamping devices may be unnecessarily bulky, complex, and/or costly.

SUMMARY

According to one embodiment, there is provided a vehicle cargo cover system, including a cover frame slider configured to be slidable along a slider axis and a ratchet strap assembly coupled to the cover frame slider. The ratchet strap assembly includes: a ratchet strap pivotably coupled to the cover frame slider about a strap axis generally parallel to the slider axis and a ratchet latch configured to accept the ratchet strap therethrough. The ratchet latch includes: a base, an advancement lever pivotable with respect to the base to advance the ratchet strap, and a releasable pawl movably coupled to the base to releasably latch the ratchet strap with respect to the base, and a hook carried by the base of the ratchet latch.

According to another embodiment, there is provided a truck bed cover system, including a cover that extends longitudinally along a longitudinal axis and a ratchet strap assembly. The cover includes a frame having rails extending along longitudinal axes and a cross-member extending between the rails along a transverse axis, and includes a collar that is slidably coupled to the cross-member along the transverse axis and that includes a strap coupling. The ratchet strap assembly includes a ratchet strap pivotably coupled to the strap coupling of the collar and pivotable about a strap axis transverse to the longitudinal axes of the frame rails. The ratchet strap assembly also includes a ratchet latch configured to accept the ratchet strap therethrough and a hook coupled to the ratchet latch. The ratchet latch includes a base, a release lever pivotably coupled to the base, a ratchet advancement lever pivotably coupled with respect to the base to advance the ratchet strap, and a releasable stop pawl pivotably coupled to the base to releasably latch the ratchet strap with respect to the base. The hook includes a base wall coupled to the base of the ratchet latch, a connecting wall extending away from the base wall, and a free end wall extending away from the connecting wall, wherein a slot is established between the base and free end walls and is configured to receive a truck bed flange.

According to yet another embodiment, there is provided a ratchet latch adapter hook, including: a base wall, a connecting wall extending away from the base wall, and a free end wall extending away from the connecting wall. The base wall includes an outboard mounting surface having a mounting bolt hole therein proximate a rearward portion and a mounting flange pocket overlapping the mounting bolt hole, and also having tang pocket therein and a pin passage extending through at least one side of the base wall and intersecting the tang pocket. A slot is established between the base and free end walls, such that the adapter hook is a slotted hook.

DETAILED DESCRIPTION

In general, a truck bed cover and clamp will be described using one or more examples of illustrative embodiments of a multi-section folding tonneau cover having a plurality of ratchet clamps for releasably clamping the cover to a pickup truck bed. Accordingly, the example embodiment(s) are described with reference to use with a particular type of pickup truck cover. However, it will be appreciated as the description proceeds that the claimed subject matter is useful in many different applications and may be implemented in many other embodiments. In this regard, and as used herein and in the claims, it will be understood that the presently disclosed apparatus is relevant not only to pickup truck applications, but also to any vehicle cargo cover applications.

Figure 1:
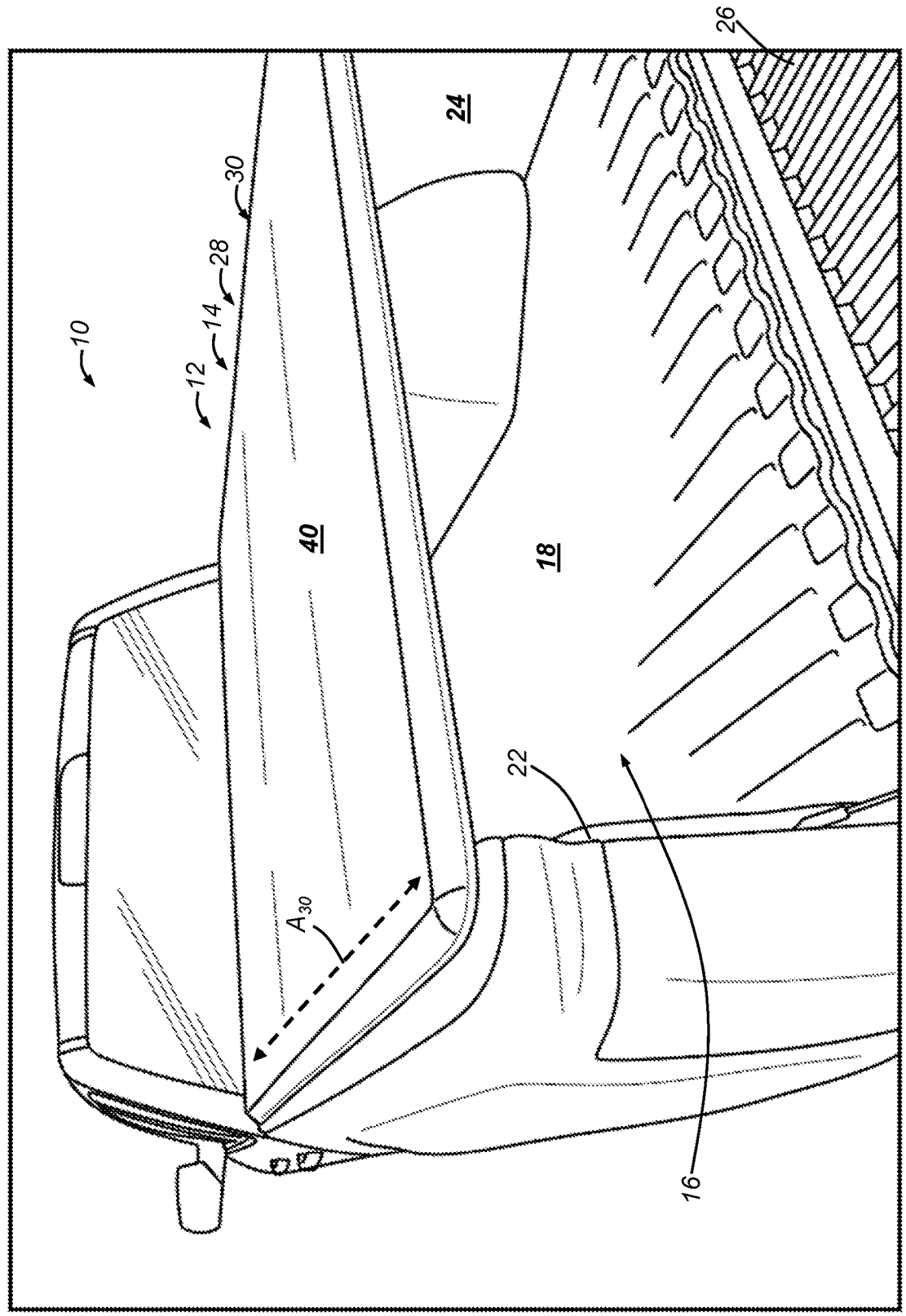
FIG. 1 is an exterior rear perspective view of a bed of a pickup truck and including an illustrative embodiment of a truck bed cover system with a cover coupled to the truck bed.

Referring specifically to the drawings, FIG. 1 illustrates a vehicle 10 with a cargo portion 12, and a vehicle cargo cover system 14. The illustrated vehicle 10 is in the form of a pickup truck having a cargo box or truck bed 16 with a truck bed floor 18, a front wall 20 (FIG. 4A), sidewalls 22, 24, and a tailgate 26. The vehicle cargo cover system 14 is in the form of a truck bed cover system 28 coupled to the truck bed 16. The cover system 14 includes a cover 30 and a plurality of ratchet strap assemblies 32 coupled to the cover 30 and attachable to the truck bed 16.

Figure 2:
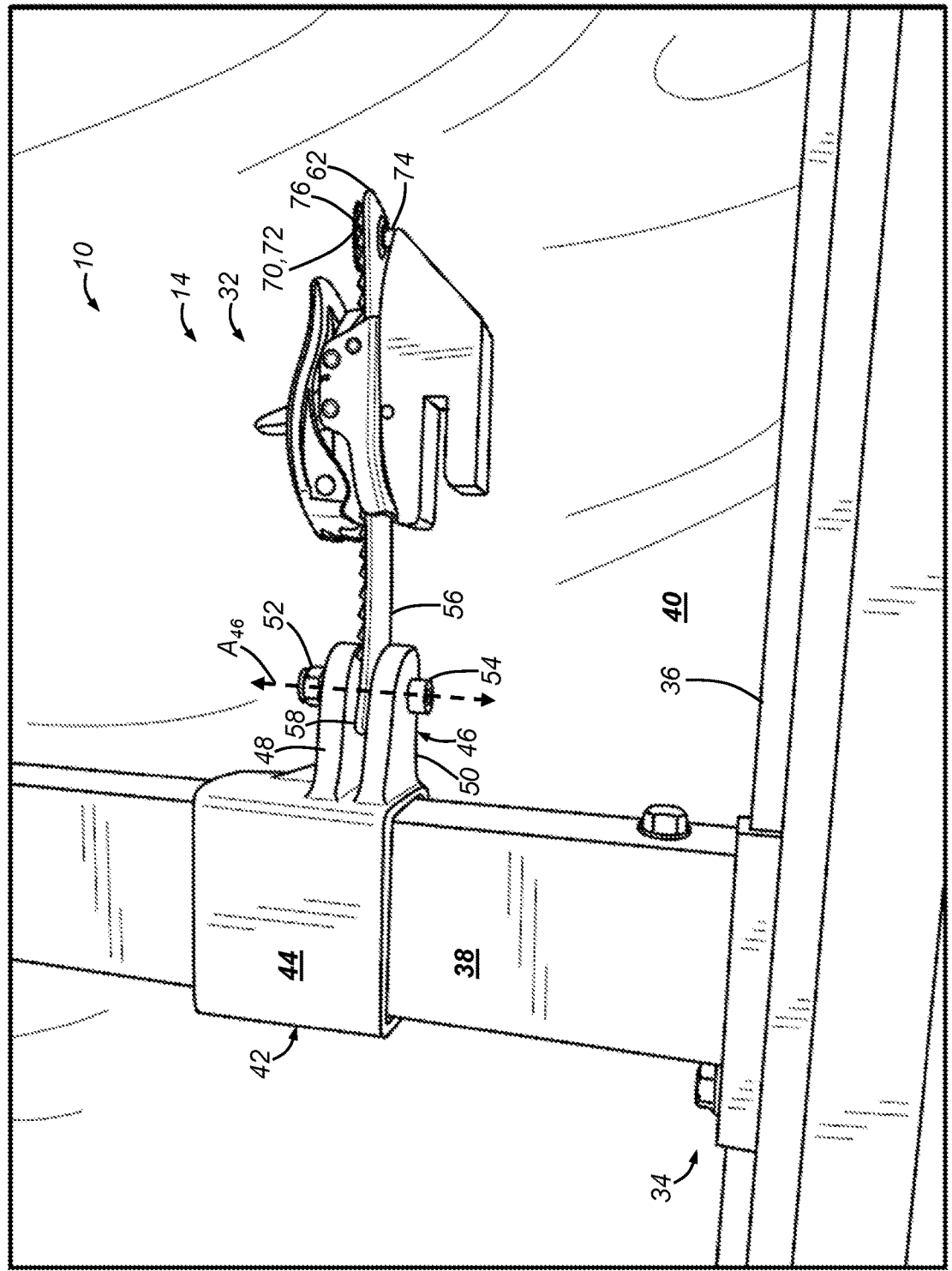
FIG. 2 is an interior perspective view of the pickup truck cover of FIG. 1, illustrating a ratchet strap assembly coupled to the cover.

With reference to FIG. 2, the cover 30 may be a multi-section foldable cover and, in any case, extends longitudinally along a longitudinal axis $A_{30}$, and may include a frame 34 having rails 36 extending along longitudinal axes $A_{36}$ and cross-members 38 extending between the rails 36 along axes $A_{38}$ transverse to the longitudinal axes $A_{36}$ of the frame rails 36. The cover 30 also may include a covering 40 over the frame 34, wherein the covering 40 may be separate from the frame 34, for instance, a flexible vinyl cover, a rigid polymeric cover, or the like.

With continued reference to FIG. 2, the cover system 14 also may include a cover frame slider 42 configured to be coupled to the corresponding cross-member 38 of the cover frame 34 and slidable along a slider axis $A_{42}$ transverse to the longitudinal axis $A_{30}$. In the illustrated embodiment, the slider 42 may include a collar 44 to entirely or partially circumscribe the cross-member 38 and be slidable therealong. The collar 44 may have a cross-sectional shape that conforms to the cross-sectional shape of the cross-member 38, for instance, rectangular as shown in the illustrated embodiment. The collar 44 may include a strap coupling 46, for example, spaced-apart flanges 48, 50 that are fastenable to another component, for instance, via a nut 52 and a bolt 54. In other embodiments, the slider 42 may include a shoe (not shown) that may be externally T-shaped for coupling with a corresponding internally T-shaped slot of a cross-member, or may include any other type of slidable coupling suitable for use on, over, or in the cross-member. In any case, one or more of the ratchet strap assemblies 32 may include a ratchet strap 56 that may be pivotably coupled to the strap coupling 46 of the collar 44 about a strap axis $A_{46}$ that may be transverse to the longitudinal axis (not parallel to the longitudinal axis) $A_{30}$ and that may be generally parallel to the slider axis $A_{42}$. As used herein, the phrase "generally parallel" means within +/−five angular degrees.

Figure 3:
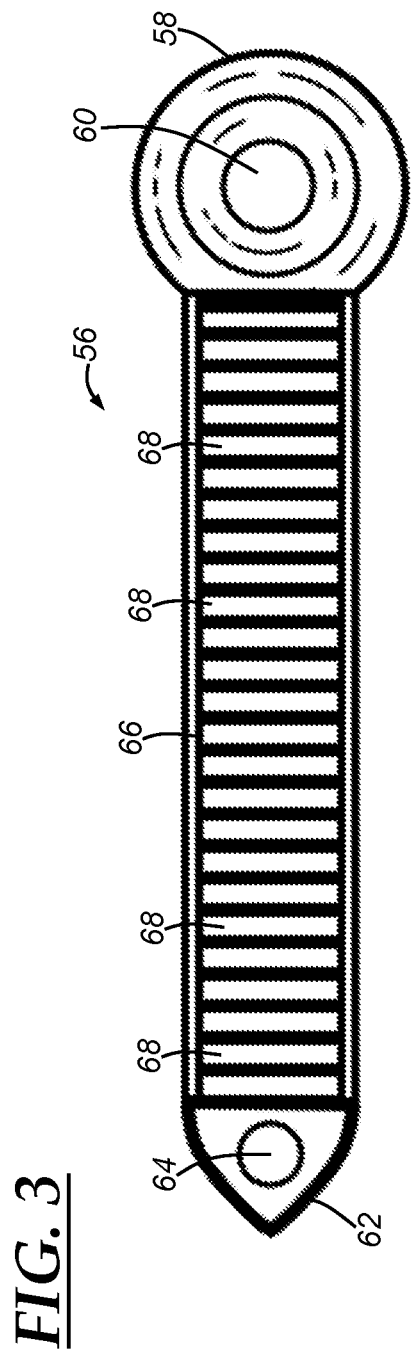
FIG. 3 is a top view of a ratchet strap of the ratchet strap assembly of FIG. 2.

With reference to FIG. 3, the ratchet strap 56 may include a fixed end 58, which may be rounded and may have an aperture 60 therethrough that may receive a stud, fastener, or the like. Also, the ratchet strap 56 may include a free end 62, which may have tapered sides and an aperture 64 therethrough. Further, the ratchet strap 56 may include a toothed portion 66 between the ends 58, 62, and that may include the illustrated axially spaced angled projections to establish teeth 68 or, in other embodiments, may include axially spaced apertures to establish teeth, or any other toothed arrangement suitable for use in a ratchet latch.

With reference again to FIG. 2, the fixed end 58 of the ratchet strap 56 may be coupled to the strap coupling 46 of the collar 44, for example, using the bolt 54 extending through the flanges 48, 50 of the collar strap coupling 46 and through the aperture 60 of the strap fixed end 58, as shown in the illustrated embodiment. In other embodiments, the strap fixed end 58 may be pivotably carried on a hook, pin, stud, or the like that may serve as the strap coupling 46, or may be coupled to any other collar strap coupling in any other manner suitable for use with a pickup truck bed cover system. In other embodiments, the fixed end 58 of the ratchet strap 56 may be coupled directly to the cross-member 38, for instance to an integral flange (not shown) of the cross-member 38 or a weldment to the cross-member 38, or, likewise, may be coupled to a corresponding portion of a rail of the cover 30. Accordingly, use of the slider 42 is preferred, but it is contemplated that the ratchet strap 56 may be coupled to the cover 30 without use of the slider 42. In any embodiment, the ratchet strap 56 may be a flexible component that can be flexed to accommodate for imperfect alignment between a strap coupling portion of the cover 40 and a corresponding connection portion of the vehicle 10. This is in contrast to typical conventional cargo cover latches that use rigid components to couple a cover to a vehicle.

In any case, the free end 62 of the ratchet strap 56 may be provided with an enlargement 70 to retain the ratchet strap assembly 32 to the ratchet strap 56 and thereby prevent the ratchet strap assembly 32 from falling off of the ratchet strap 56. The enlargement 70 may include an integral enlargement unitary with the strap, or, as shown in FIG. 2, may include one or more separate components coupled to the free end 58 of the ratchet strap. For example, as illustrated in FIG. 2, a large rivet 72 may have a shank 74 extending through the aperture 64 of the free end 62 and one or more opposed heads and/or projections 76 that may be wider and/or taller in dimension than corresponding portions of a strap passage of the ratchet strap assembly 32 to prevent the free end 62 from passing through the ratchet strap assembly 32.

Figure 4A:
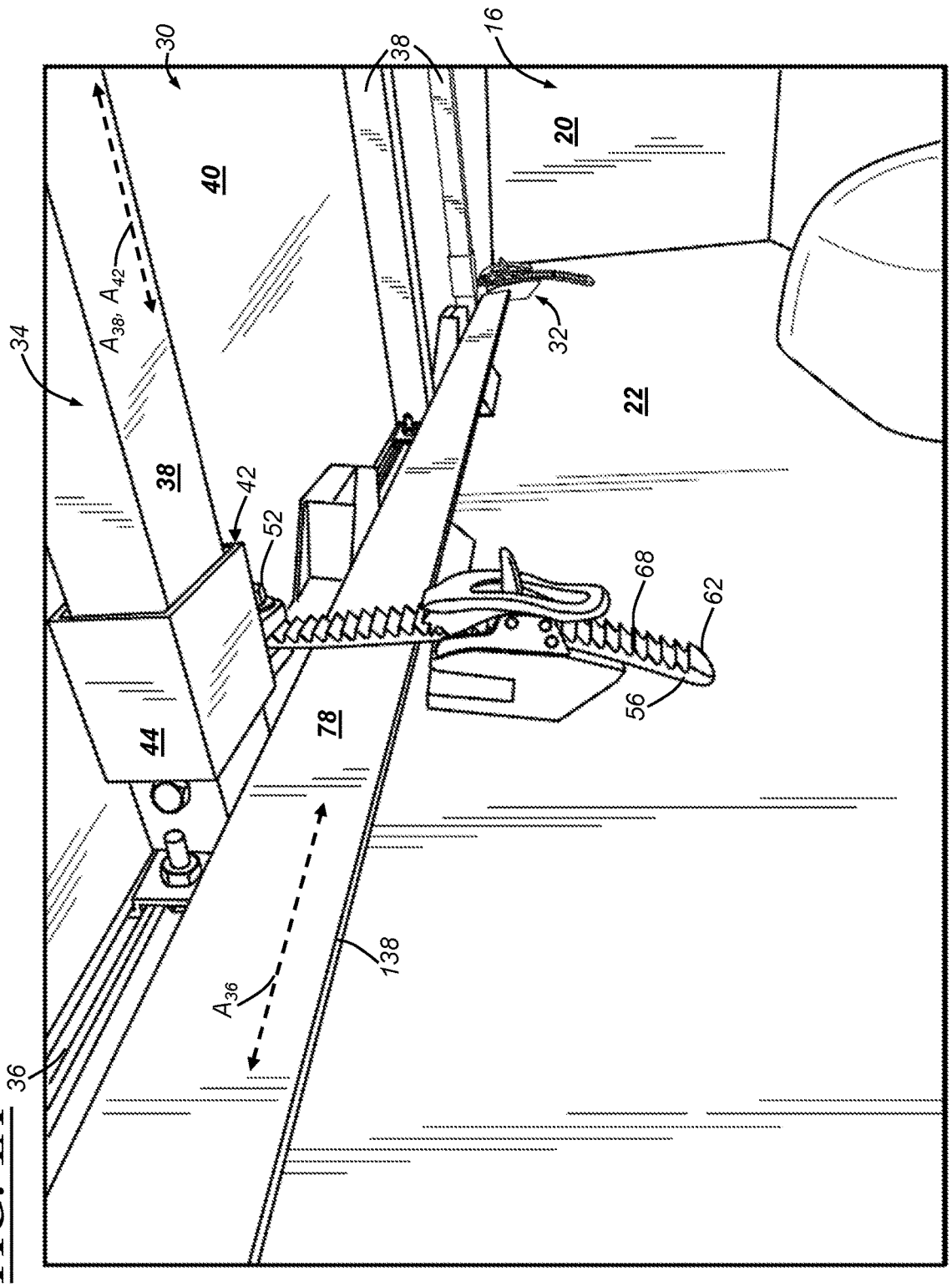
FIG. 4A is an interior rear perspective view of the pickup truck bed and cover of FIG. 1, and illustrating the ratchet strap assembly of FIG. 2 coupled to the cover and ready to be coupled to a downwardly extending flange of the truck bed.
Figure 4B:
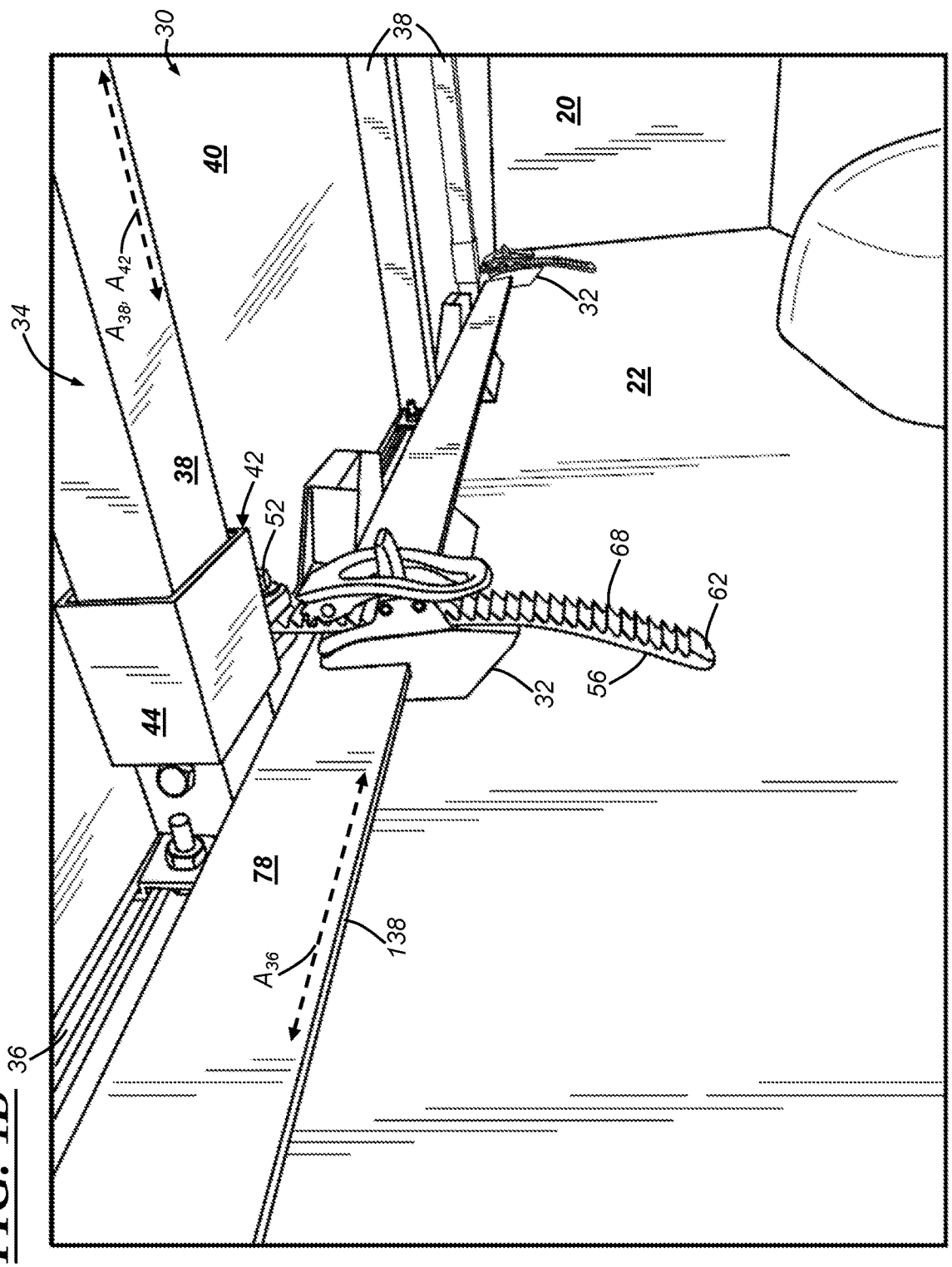
FIG. 4B is an interior rear perspective view of the pickup truck bed and cover of FIG. 1, and illustrating the ratchet strap assembly of FIG. 2 coupled to the cover and coupled to the downwardly extending flange of the truck bed.

With reference to FIG. 4A, the ratchet strap assembly 32 is shown coupled to the cover 30 and positioned so as to be ready for coupling to a downwardly extending flange 78 of the truck bed 16 and, with reference to FIG. 4B, the ratchet strap assembly 32 is shown coupled to the downwardly extending flange 78 of the truck bed 16, as will be described in more detail herein below.

Figure 5:
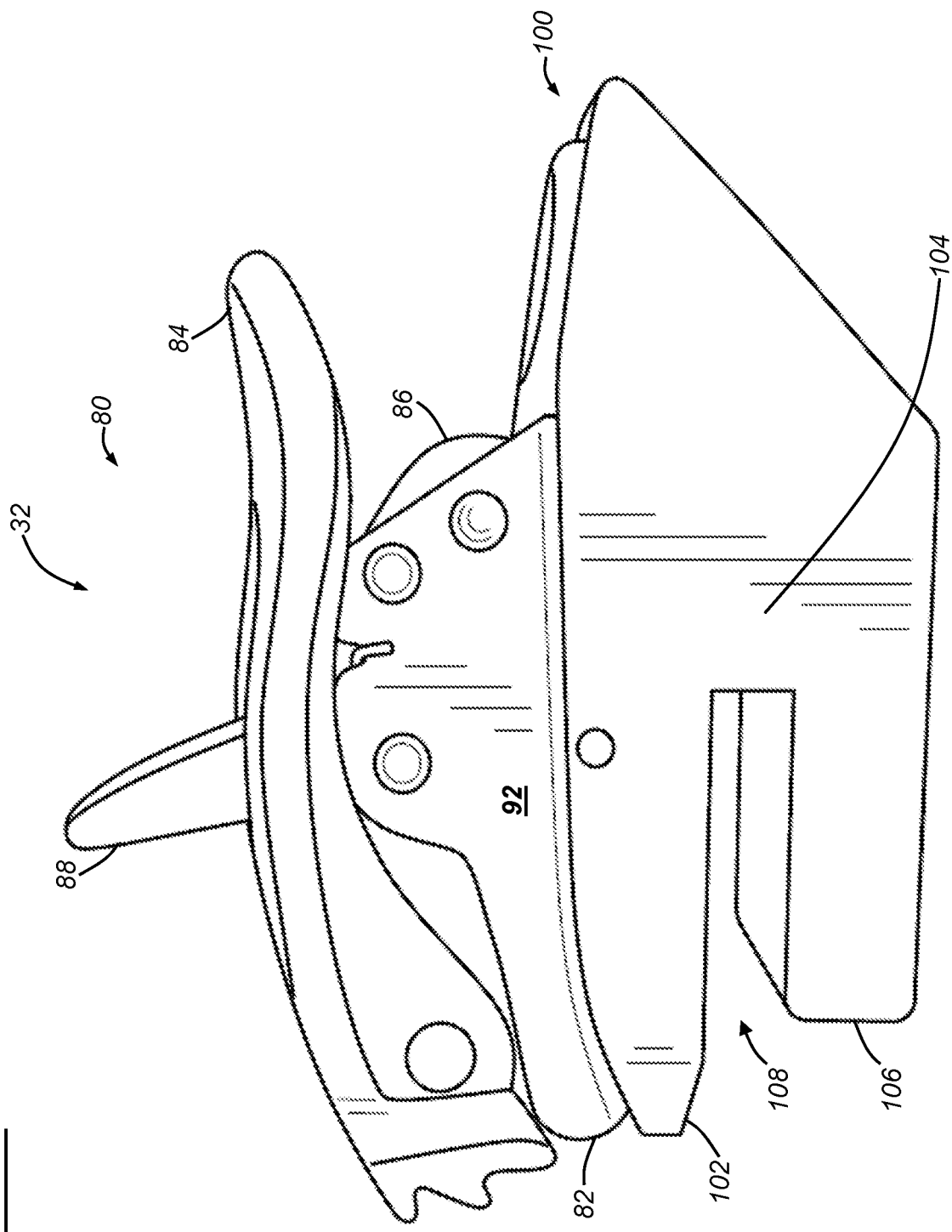
FIG. 5 is a side perspective view of a ratchet latch and adapter of the ratchet strap assembly of FIG. 2, wherein the ratchet latch is shown in a rest position.
Figure 8:
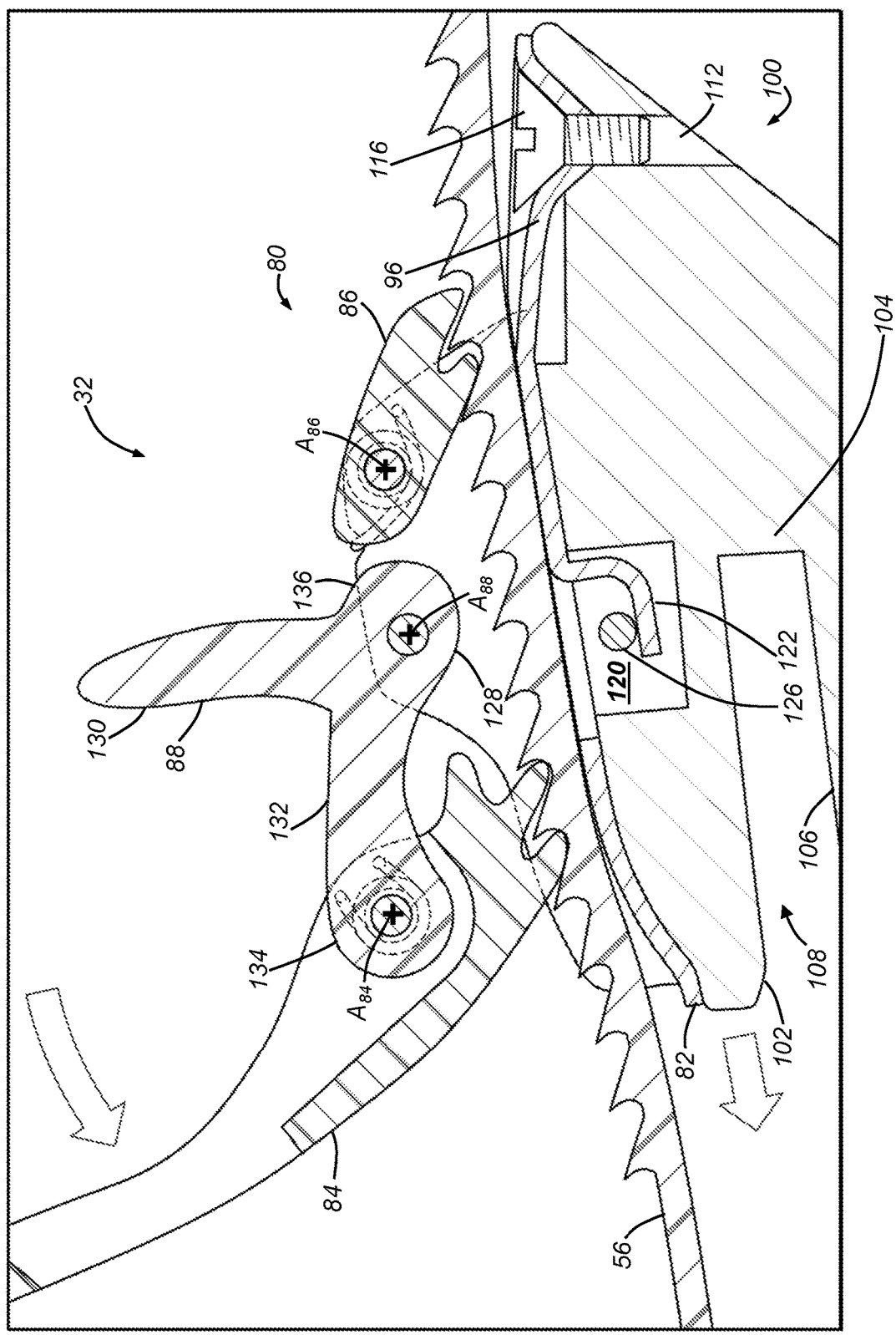
FIG. 8 is a cross-sectional view of the ratchet latch and adapter of FIG. 5 and the ratchet strap of FIG. 3, illustrating an advancement lever in an actuated position to advance the ratchet strap.

With reference to FIG. 5, one or more of the ratchet strap assemblies 32 may include a ratchet latch 80 configured to accept the ratchet strap 56 therethrough. The ratchet latch 80 includes a base 82, a releasable advancement lever 84 that may be pivotable with respect to the base 82 to advance the ratchet strap 56, a releasable stop pawl 86 that may be movably coupled to the base 82 to releasably latch the ratchet strap 56 with respect to the base 82, and a release lever 88 that may be pivotable with respect to the base 82 and/or to the advancement lever 84 and that may be engageable with the stop pawl 86 to release the advancement lever 84 and the stop pawl 86, as will be described in further detail herein below. With additional reference to FIG. 6, the base 82 may include a basal wall 90 and sidewalls 92, 94 (FIG. 11) extending away from the basal wall 90. Also, the basal wall 90 may include a mounting bolt flange 96 with a bolt hole 98 therethrough. The release lever 88 may be pivotably coupled to and between the sidewalls 92, 94 of the base 82 about a release lever pivot axis $A_{88}$ (FIG. 8). Additionally, the advancement lever 84 may be pivotably coupled to the release lever 88 about an advancement lever pivot axis $A_{84}$ (FIG. 8). Also, the releasable stop pawl 86 may be pivotably coupled to and between the sidewalls 92, 94 of the base 82 about a pawl pivot axis $A_{86}$ (FIG. 8). The release lever pivot axis $A_{88}$ may be disposed between the stop pawl and advancement lever pivot axes $A_{86}$, $A_{84}$. The various pivot axes may be established by hinge pins, projections, screws, rivets, or the like, and the levers 84, 88 and the stop pawl 86 may be biased toward their rest position of FIG. 5 by torsional springs, leaf springs, integral spring members, or any other means for biasing levers and pawls of a ratchet mechanism.

Figure 6:
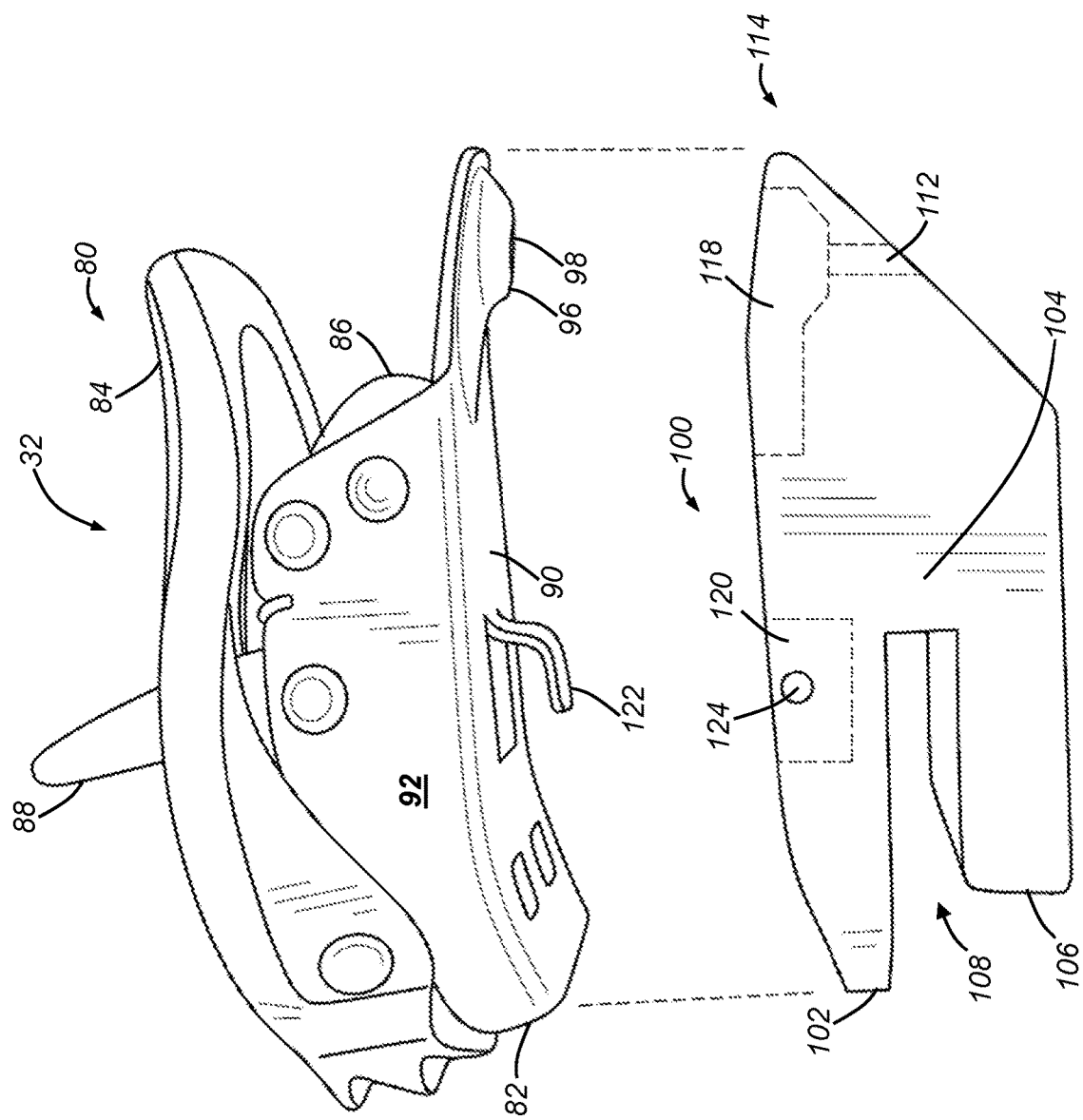
FIG. 6 represents an exploded side view of the ratchet latch and adapter of the ratchet strap assembly of FIG. 2.
Figure 7:
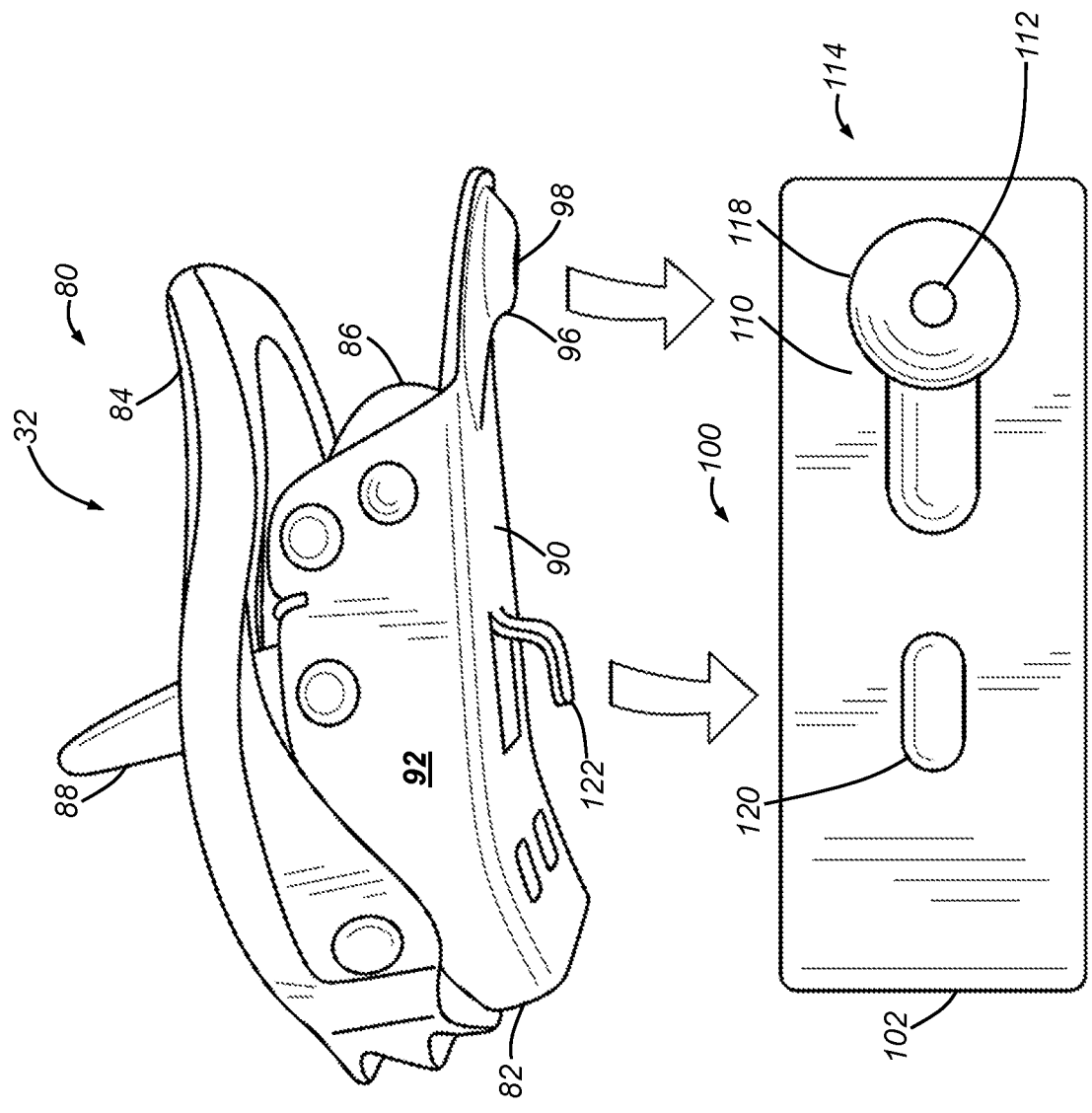
FIG. 7 is a top view of the adapter of FIGS. 5 and 6.

With reference to FIGS. 6-7, the ratchet latch 80 also includes a hook 100. In one embodiment, the hook 100 may be an integral portion of the base 82 of the ratchet latch 80, for instance, a hooked tang formed from the basal wall 90 of the ratchet latch base 80, a bent over flange of the basal wall 90, or any other suitable portion of the ratchet latch base 80. In a preferred embodiment, however, the hook 100 is an adapter component separate from the base 82 of the ratchet latch 80 and is fastened thereto. In this embodiment, the hook 100 may be a slotted hook that includes a base wall 102 coupled to the base 82 of the ratchet latch 80, a connecting wall 104 extending away from the base wall 102, and a free end wall 106 extending away from the connecting wall 104, wherein a slot 108 is established between the base and the free end walls 102, 106, and is configured to receive a corresponding one of the truck bed sidewall flanges 78.

The base wall 102 includes an outboard mounting surface 110 having a mounting bolt hole 112 therein proximate a rearward portion 114 for accepting a mounting bolt 116 (FIG. 8) and a mounting flange pocket 118 overlapping the mounting bolt hole 112 for accepting a portion of the mounting bolt flange 96 of the basal wall 90 of the ratchet latch base 82. The base wall 102 also may include a tang pocket 120 in the mounting surface to receive a hooked tang 122 of the basal wall 90 of the ratchet latch base 82, and a pin passage 124 extending through at least one side of the base wall 102 and intersecting the tang pocket 120. The pin passage 124 accepts a pin 126 (FIG. 8) therein to provide an anchor for the hooked tang 122 of the ratchet latch base 82. In other embodiments, the hook 100 need not include the slot 108 to accept a flange therein, and may include a ridge, lip, or the like to cooperate with a corresponding ridge, lip, or the like of the truck bed 16. In still other embodiments, the hook 100 may include a projection that may project into a corresponding aperture, recess, or the like, in a corresponding portion of the truck bed 16.

With reference to FIG. 8, the advancement lever 84 may be raised and rotated about its pivot axis $A_{84}$ with the release lever 88 so as to engage teeth of a forward end of the advancement lever 84 with teeth of the ratchet strap 56 so as to feed or push the ratchet strap 56 relative to the ratchet base 82. Of course, the ratchet strap 56 feeds past the stop pawl 86, tooth by tooth of the ratchet strap 56.

Figure 9:
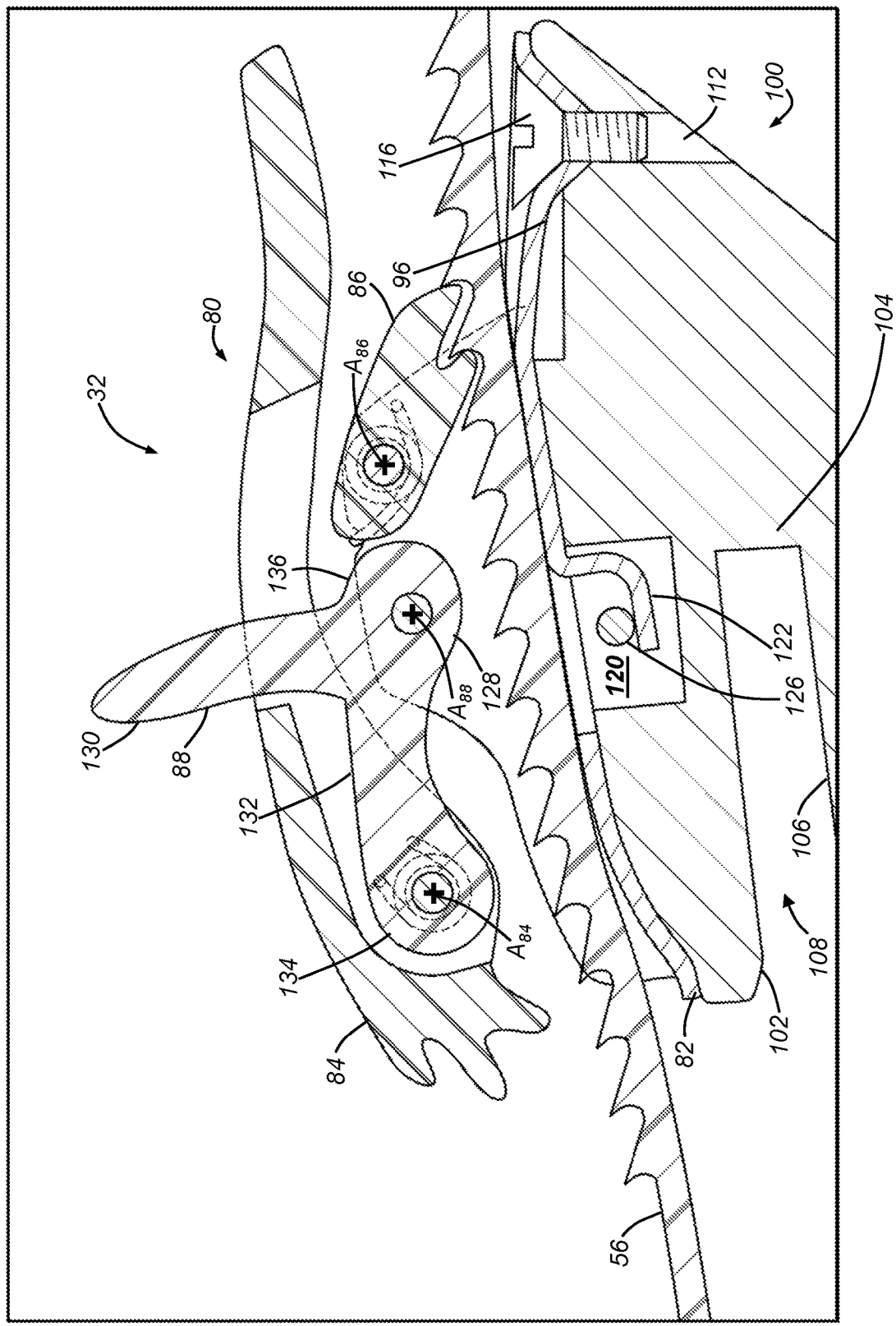
FIG. 9 is a cross-sectional view of the ratchet latch and adapter of FIG. 5, illustrating a release lever being actuated to release the advancement lever and a stop pawl.
Figure 10:
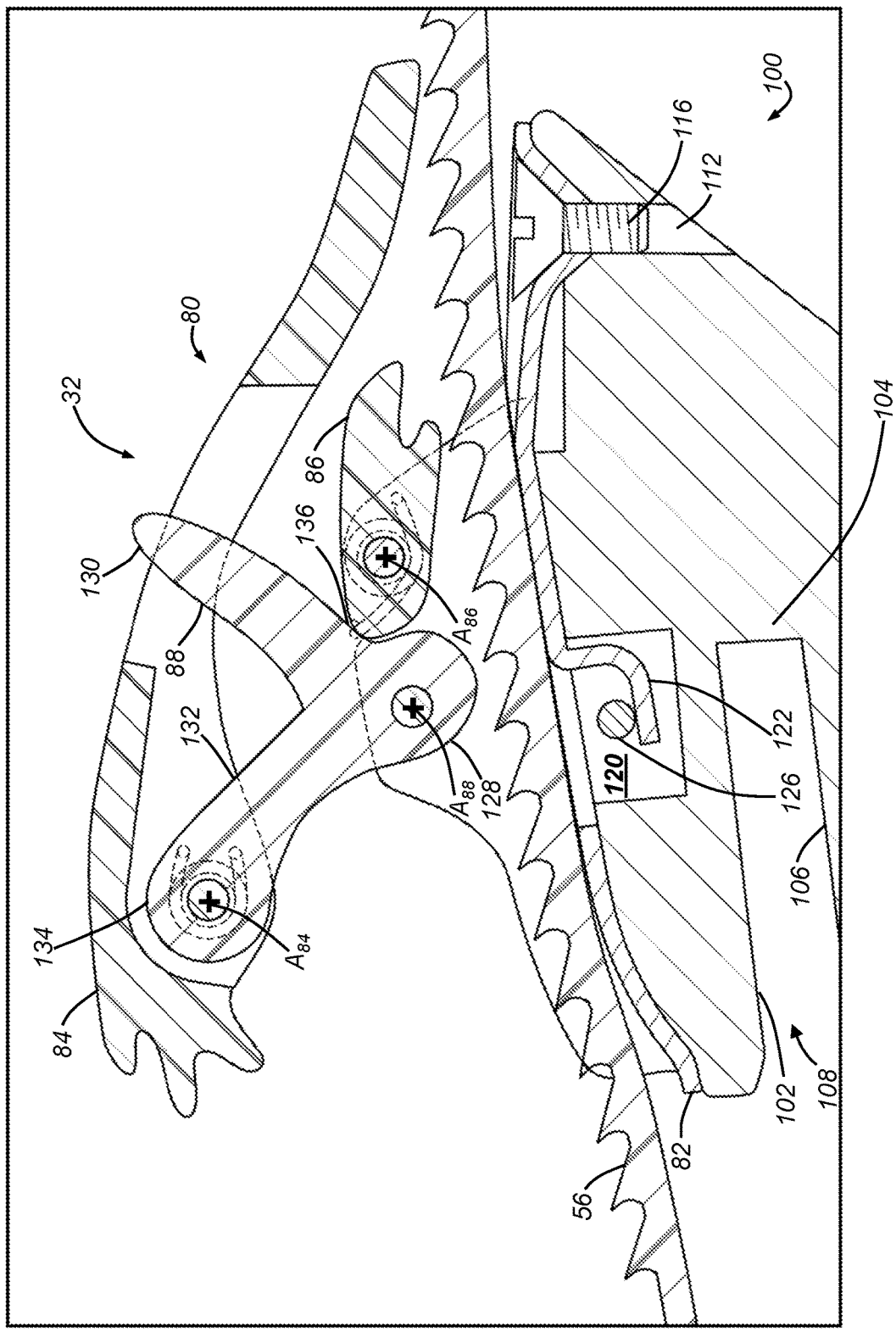
FIG. 10 is a cross-sectional view similar to that of FIG. 9, but showing the release lever further being actuated to further release the advancement lever and the stop pawl.
Figure 11:
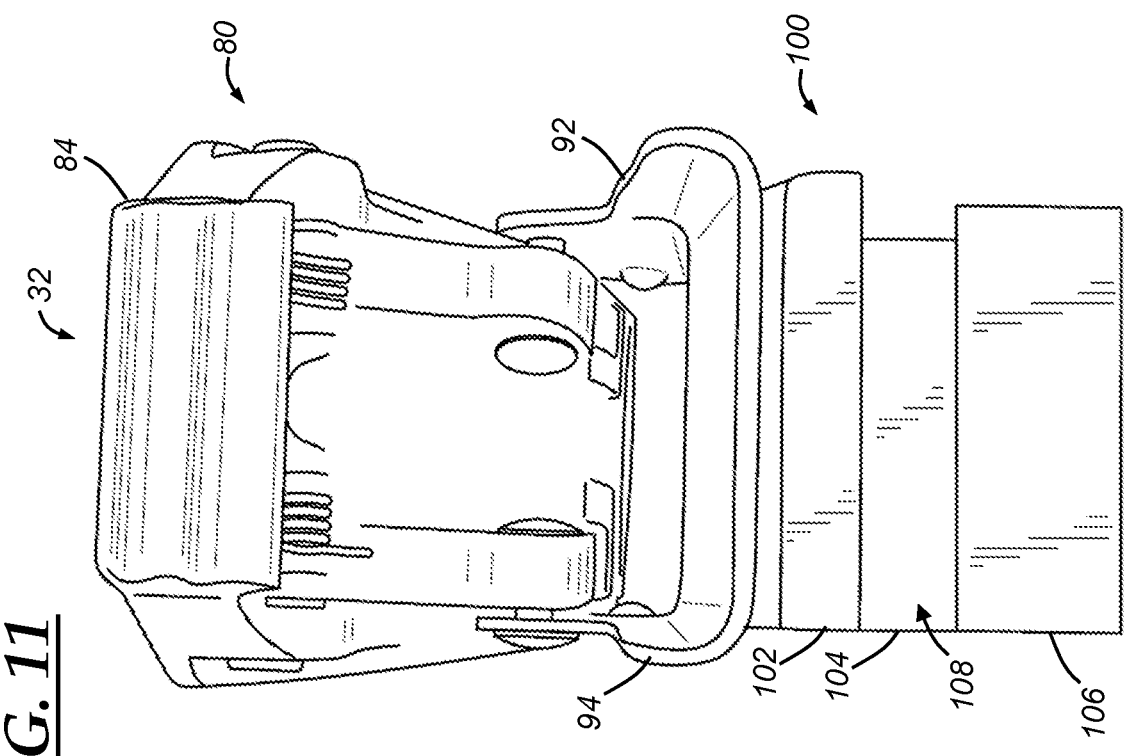
FIG. 11 is an end view of the ratchet latch and adapter of FIG. 5.

With reference to FIGS. 9 through 11, the release lever 88 may be pulled and rotated about its pivot axis $A_{88}$ with the ratchet base 82 so as to raise the advancement lever 84 out of engagement with the ratchet strap 56 and so as to cam against the stop pawl 86 and thereby pivot the stop pawl 86 about its pivot axis $A_{86}$ out of engagement with the ratchet strap 56. The release lever 88 may be generally L-shaped with a pivot axis portion 128 pivotably coupled to the ratchet base 82, a handle portion 130 extending outwardly away from the pivot axis portion 128, a lever portion 132 extending forward along the base 82 and terminating in an advancement lever pivot portion 134 to which the advancement lever 84 is pivotably coupled, and a cam portion 136 extending rearward along the base 82 for camming against the stop pawl 86. Although a particular type of ratchet mechanism is presently described and illustrated, the present disclosure includes any other type of ratchet mechanism suitable for use with a ratchet strap as otherwise disclosed herein for retaining a vehicle cargo cover to a vehicle.

In assembly, and with reference to FIG. 7, the pin 126 (FIG. 8) of the adapter hook 100 is pushed into its corresponding pin hole 124 in the adapter hook 100, the tang 122 of the ratchet latch base 82 is slipped into its corresponding pocket 120 in the adapter hook 100 and under the pin 126, and the mounting bolt 116 is slipped into the hole 98 of the mounting bolt flange 96 and threaded into the adapter hook 100 to establish the ratchet latch and adapter assembly 32. Then, with reference to FIG. 2, the ratchet strap 56 is fed through the latch 80 until at least one tooth of the strap 56 is releasably engaged to the pawl 86 to retain the ratchet latch 80 to the strap 56, and the strap enlargement 70 may be formed in, and/or applied to, the ratchet strap 56. Thereafter, the slider 42 is coupled to the cross-member 38 so as to be slidable with respect thereto along the slider axis $A_{42}$, which is transverse to the longitudinal axis $A_{30}$ of the cover 30. Subsequently, the fixed end 58 of the ratchet strap 56 is coupled to the strap coupling 46 of the slider 42, for example, by screwing, bolting, riveting, or any other fastening, or the like, so as to be pivotable about the strap axis $A_{46}$ that is transverse to the longitudinal axis $A_{30}$ of the cover 30. The assembly steps may be carried out in any suitable order.

In operation, and with reference to FIG. 4A, the cover 30 is unfolded or otherwise moved into a closed position with respect to the truck bed 16. Then, the slot 108 of the hook 100 may be aligned with a free edge 138 of the downwardly turned flange 78 of the truck bed 16 or any other suitable portion of the truck bed. Thereafter, and with reference to FIG. 4B, the ratchet latch 80 is moved toward the free edge 138 or other portion so that the ratchet latch 80 ratchets along the ratchet strap 56 until the free edge 138 bottoms out in the slot 108 or another portion of the hook 100 pressures a corresponding portion of the truck bed 16. Subsequently, the advancement lever 84 is actuated to further advance the ratchet latch 80 along the ratchet strap 56 and thereby tighten the ratchet latch 80 between the cover 30 and the vehicle 10 to secure the cover to the vehicle 10.

Contrary to conventional wisdom in the art of tonneau cover latches, the presently disclosed apparatus does not include the typical bulky and custom-designed spring-loaded handle that is slidable with respect to a custom-designed rigid coupler pivotably mounted to a cover about a pivot axis parallel to a longitudinal axis of the cover, or the bulky and custom-designed over-center handle and linkage mechanisms of the prior art. Instead, the presently disclosed apparatus provides a compact, simple, and inexpensive alternative to such prior tonneau cover latches.

As used in this patent application, the terminology "for example," "for instance," "like," "such as," "comprising," "having," "including," and the like, when used with a listing of one or more elements, is open-ended, meaning that the listing does not exclude additional elements. Likewise, when preceding an element, the articles "a," "an," "the," and "said" mean that there are one or more of the elements. Moreover, directional words such as front, rear, top, bottom, upper, lower, radial, circumferential, axial, lateral, longitudinal, vertical, horizontal, transverse, and/or the like are employed by way of example and not limitation. As used herein, the term "may" is an expedient merely to indicate optionality, for instance, of an element, feature, or other thing, and cannot be reasonably construed as rendering indefinite any disclosure herein. Other terms are to be interpreted and construed in the broadest reasonable manner in accordance with their ordinary and customary meaning in the art, unless the terms are used in a context that requires a different interpretation.

Finally, the present disclosure is not a definitive presentation of an invention claimed in this patent application, but is merely a presentation of examples of illustrative embodiments of the claimed invention. More specifically, the present disclosure sets forth one or more examples that are not limitations on the scope of the claimed invention or on terminology used in the accompanying claims, except where terminology is expressly defined herein. And although the present disclosure sets forth a limited number of examples, many other examples may exist now or are yet to be discovered and, thus, it is neither intended nor possible to disclose all possible manifestations of the claimed invention. In fact, various equivalents will become apparent to artisans of ordinary skill in view of the present disclosure and will fall within the spirit and broad scope of the accompanying claims. Features of various implementing embodiments may be combined to form further embodiments of the invention. Therefore, the claimed invention is not limited to the particular examples of illustrative embodiments disclosed herein but, instead, is defined by the accompanying claims.

The invention claimed is:

1. A vehicle cargo cover system, comprising:
   a cover frame slider configured to be slidable along a slider axis; and
   a ratchet strap assembly coupled to the cover frame slider, and including:
      a ratchet strap pivotably coupled to the cover frame slider about a strap axis generally parallel to the slider axis,
      a ratchet latch configured to accept the ratchet strap therethrough and including:
         a base,
         an advancement lever pivotable with respect to the base to advance the ratchet strap, and
         a releasable pawl movably coupled to the base to releasably latch the ratchet strap with respect to the base, and
      a hook carried by the base of the ratchet latch.

2. The system of claim 1, further comprising a cover extending longitudinally along a longitudinal axis and including a frame having a cross-member extending transversely with respect to the longitudinal axis and carrying the cover frame slider.

3. The system of claim 1, wherein the ratchet strap is pivotable about the strap axis, wherein the strap axis is transverse with respect to the longitudinal axis of the cover.

4. The system of claim 1, wherein the base of the ratchet latch includes a basal wall and sidewalls extending away from the basal wall.

5. The system of claim 4, further comprising a release lever pivotably coupled to and between sidewalls of the base about a release lever pivot axis, wherein the advancement lever is pivotably coupled to the release lever about an advancement lever pivot axis, and the releasable pawl is pivotably coupled to and between the sidewalls of the base about a pawl pivot axis.

6. The system of claim 1, wherein the hook is an integral portion of the base of the ratchet latch.

7. The system of claim 1, wherein the hook is an adapter separate from the base of the ratchet latch and is coupled thereto.

8. The system of claim 7, wherein the hook includes a base wall coupled to the base of the ratchet latch, a connecting wall extending away from the base wall, and a free end wall extending away from the connecting wall, wherein a slot is established between the base and free end walls, such that the hook is a slotted hook.

9. The system of claim 8, wherein the base wall of the hook also includes a tang pocket to receive a hooked tang of the basal wall of the ratchet latch base, and a pin passage intersecting the tang pocket and at least one sidewall of the hook, and a pin extending through the pin passage and into the tang pocket to provide an anchor for the hooked tang of the ratchet latch base.

10. The system of claim 9, wherein the basal wall includes a mounting bolt flange with a bolt hole therethrough, and wherein the base wall of the hook includes a mounting surface having a mounting bolt hole for accepting a mounting bolt and a flange pocket for accepting a portion of the mounting bolt flange of the basal wall of the ratchet latch base.

11. A truck bed cover system, comprising:
    a cover extending longitudinally along a longitudinal axis and including:
       a frame having rails extending along longitudinal axes and a cross-member extending between the rails along a transverse axis, and
       a collar slidably coupled to the cross-member along the transverse axis and including a strap coupling; and
    a ratchet strap assembly, including:
       a ratchet strap pivotably coupled to the strap coupling of the collar and pivotable about a strap axis transverse to the longitudinal axes of the frame rails,
       a ratchet latch configured to accept the ratchet strap therethrough, and including:
          a base,
          a release lever pivotably coupled to the base,
          a ratchet advancement lever pivotably coupled with respect to the base to advance the ratchet strap, and
          a releasable stop pawl pivotably coupled to the base to releasably latch the ratchet strap with respect to the base, and
       a hook coupled to the ratchet latch and including:
          a base wall coupled to the base of the ratchet latch,
          a connecting wall extending away from the base wall, and
          a free end wall extending away from the connecting wall,
          wherein a slot is established between the base and free end walls and is configured to receive a truck bed flange.

12. The system of claim 11, wherein the base of the ratchet latch includes a basal wall and sidewalls extending away from the basal wall.

13. The system of claim 11, wherein the advancement lever is pivotably coupled to the release lever about an advancement lever pivot axis, and the releasable stop pawl is pivotably coupled to and between the sidewalls of the base about a pawl pivot axis.

14. The system of claim 11, wherein the base wall of the hook also includes a tang pocket to receive a hooked tang of the basal wall of the ratchet latch base, and a pin passage intersecting the tang pocket and at least one sidewall of the hook, and a pin extending through the pin passage and into the tang pocket to provide an anchor for the hooked tang of the ratchet latch base.

15. The system of claim 14, wherein the basal wall includes a mounting bolt flange with a bolt hole therethrough, and wherein the base wall of the hook includes a mounting surface having a mounting bolt hole for accepting a mounting bolt and a flange pocket for accepting a portion of the mounting bolt flange of the basal wall of the ratchet latch base.

16. A truck, comprising:
a truck bed including a front wall, sidewalls having inboard downwardly extending flanges, and a tailgate; and
the truck bed cover system of claim 11 coupled to the truck bed.

17. The system of claim 16, wherein the ratchet strap includes an enlargement at a free end thereof to prevent the ratchet latch from separating from the ratchet strap.

18. A ratchet latch adapter hook, comprising:
a base wall including an outboard mounting surface having a mounting bolt hole therein proximate a rearward portion and a mounting flange pocket overlapping the mounting bolt hole, and also having tang pocket therein and a pin passage extending through at least one side of the base wall and intersecting the tang pocket,
a connecting wall extending away from the base wall, and
a free end wall extending away from the connecting wall, wherein a slot is established between the base and free end walls, such that the adapter hook is a slotted hook.

19. A ratchet strap assembly, comprising:
the adapter hook of claim 18; and
a pin carried in the pin passage and extending into the tang pocket; and
a ratchet latch including a base with a basal wall having a hooked tang extending therefrom and into the tang pocket of the base wall of the adapter hook and retained by the pin.

20. The ratchet strap assembly of claim 19, further comprising a mounting bolt, wherein the ratchet latch base also includes a mounting bolt flange, and wherein the adapter hook further comprises a mounting bolt hole for accepting the mounting bolt and a mounting flange pocket overlapping the mounting bolt hole for accepting a portion of the mounting bolt flange of the ratchet latch base.

\* \* \* \* \*